(12) United States Patent
Sterling

(10) Patent No.: US 9,016,643 B2
(45) Date of Patent: Apr. 28, 2015

(54) APPARATUS FOR MOUNTING ACCESSORY EQUIPMENT TO TOW HOOKS

(71) Applicant: David Sterling, Salinas, CA (US)

(72) Inventor: David Sterling, Salinas, CA (US)

(*) Notice: Subject to any disclaimer, the term of this patent is extended or adjusted under 35 U.S.C. 154(b) by 0 days.

(21) Appl. No.: 14/280,623

(22) Filed: May 18, 2014

(65) Prior Publication Data

US 2014/0346299 A1 Nov. 27, 2014

Related U.S. Application Data

(60) Provisional application No. 61/825,749, filed on May 21, 2013.

(51) Int. Cl.
*B60D 1/48* (2006.01)
*B60D 1/52* (2006.01)
*B60D 1/56* (2006.01)

(52) U.S. Cl.
CPC ...... *B60D 1/488* (2013.01); *B60D 1/52* (2013.01); *B60D 1/565* (2013.01)

(58) Field of Classification Search
CPC ........ B62D 25/209; B60D 1/488; B60D 1/56; B60D 1/52; B60D 1/565
USPC ........ 248/228.1, 200, 300, 316.1, 316.8, 304; 280/495, 500, 491.5, 504, 505
See application file for complete search history.

(56) References Cited

U.S. PATENT DOCUMENTS

| | | | | |
|---|---|---|---|---|
| 1,479,182 | A * | 1/1924 | Jeschke | 280/491.5 |
| 2,486,161 | A * | 10/1949 | Hughes | 280/502 |
| 6,312,004 | B1 * | 11/2001 | Kiss | 280/507 |
| 6,457,733 | B1 * | 10/2002 | Hansen | 280/481 |
| 6,457,734 | B1 * | 10/2002 | Hansen | 280/481 |
| 6,896,281 | B2 * | 5/2005 | Lenzen et al. | 280/495 |
| 6,902,183 | B2 * | 6/2005 | Rodgers | 280/514 |
| 6,913,277 | B2 * | 7/2005 | Mrofka et al. | 280/491.5 |
| 7,222,873 | B2 * | 5/2007 | Rodgers | 280/495 |
| 7,618,228 | B2 * | 11/2009 | Luciano | 414/563 |
| 7,758,060 | B2 * | 7/2010 | Lopez et al. | 280/495 |
| 2008/0001383 | A1 * | 1/2008 | Hodoya et al. | 280/477 |

* cited by examiner

*Primary Examiner* — Anita M King
(74) *Attorney, Agent, or Firm* — Michael Toback

(57) ABSTRACT

A device for adjustably and removably mounting accessory equipment to tow hooks of a vehicle without alteration to the bumper or surrounding fascia components. The device includes two angle brackets a mounting flange and a clamping plate. Each bracket has holes that align with the other bracket and with the mounting flange which attaches to accessory equipment. The assembly of the brackets and clamping plate surround the tow hook, which the mounting flange attaches to the accessory equipment. One possible piece of accessory equipment is a bumper guard, which can provide protection from debris damaging the vehicle oil cooler. Detachable brush bars provide further protection from brush harming the sides of the moving vehicle.

11 Claims, 6 Drawing Sheets

APPARATUS FOR MOUNTING ACCESSORY EQUIPMENT TO TOW HOOKS

This patent is a continuation of "Off Road Bumper Guard", filed on May 21, 2013 as U.S. Provisional Application No. 61/825,749.

FIELD OF THE INVENTION

The present invention generally relates to mounting systems for attaching accessory equipment to various production configurations of tow hooks. Accessory equipment are "after market" devices mountable to the front of the vehicle, such as bumper guards, grille guards, and light bars.

BACKGROUND OF THE INVENTION

Common configurations of vehicles impose multiple demands on the design of mounting systems intended for mounting accessory equipment. A commonly used point of attachment for these accessory equipment are the structural members behind the vehicle bumper. In the prior art, alteration or removal of the vehicle tow hooks, factory bumper or surrounding fascia components may be required to enable mounting accessory equipment to tow hooks. Systems not requiring removal of the tow hooks and using the tow hooks for support attach the accessory equipment down in such a manner that it is difficult to align the accessory equipment with respect to the front of the vehicle.

A truck or car going off road can get debris passing through its air intake opening which can damage the transmission oil cooler. A solution is needed to provide protection from the debris. Also, vehicles can get scratches on their sides or even puncture the sides of tires from sage brush or other similar plants.

A solution is needed to provide an apparatus for adjustably mounting accessory equipment to the tow hooks without requiring alteration of the bumper or surrounding fascia components.

SUMMARY

A device for adjustably and removably mounting accessory equipment to tow hooks of a vehicle without alteration to the bumper or surrounding fascia components. The device includes two angle brackets a mounting flange and a clamping plate. Each bracket has holes that align with the clamping plate and with the mounting flange which attaches to the accessory equipment. The assembly of the brackets and clamping plate surround the tow hook. The mounting flange attaches to the accessory equipment. One possible piece of accessory equipment is a bumper guard, which can provide protection from debris damaging the vehicle oil cooler. Detachable brush bars provide further protection from brush harming the sides of the moving vehicle.

DETAILED DESCRIPTION OF PREFERRED EMBODIMENTS

Figure 1:
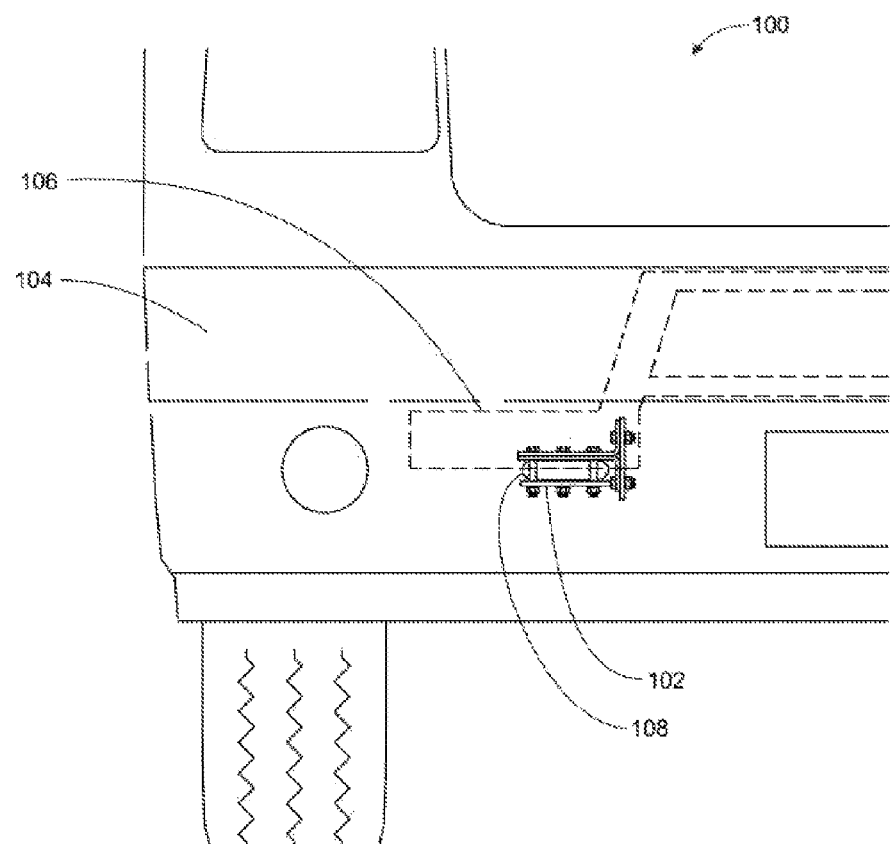
FIG. 1 shows one embodiment of one or more embodiments of the mounting system in place, including a bumper guard assembly.

FIG. 1 shows one or more embodiments of the mounting system in place on one side of the vehicle 100. Also shown is part of the accessory equipment, including a crossbeam 106 that would be positioned in front of the bracket assembly 102 and the bumper 104. The crossbeam of the accessory equipment 106 is connected to the mounting system 102 which are detachably connected to each of the tow hooks 108. The mounting system provides a means of attachment to existing tow hooks without alteration or removal of the vehicle factory bumper or surrounding fascia components.

Herein we use the term "fascia components" for all of the cosmetic plastic that manufacturers put onto cars surrounding a bumper.

Herein we use the term crossbeam, to refer to one or more structural members, regardless of shape or orientation, of the accessory equipment to which the mounting system is attached. The invention assumes that accessory equipment will include one or more crossbeams that the mounting flange can be attached to.

Herein we use the term "air intake opening" to refer to openings in the front of the vehicle, located at the bottom of, or below, the radiator grille that allow cooling air to enter the engine compartment. Commonly used for transmission oil coolers, the air intake opening is often not protected by a factory grille.

The mounting system consists of one bracket assembly for each tow hook. In one or more embodiments, each bracket assembly consists of two angle brackets, a clamping plate, and a mounting flange. Each angle bracket has holes that align with the other angle bracket, the clamping plate, and the mounting flange. The mounting flange is attachable to the crossbeam of the accessory equipment. The bracket assembly is configured so that all the angle brackets are fastened to each other, the clamping plate, and to the mounting flange. As installed around the tow hook, each bracket assembly provides capability of lateral or angular adjustment to align the accessory equipment with the front of the vehicle.

In one or more embodiments, the mounting system can be used to mount accessory equipment such as a bumper guard, light bar, or grille guard to the front of the vehicle, each bracket assembly attaching to a crossbeam of the accessory equipment. In other embodiments, the bracket assembly can be used to temporarily attach an accessory device quickly and easily to the front of the vehicle. In one or more embodiments, the crossbeam of the accessory equipment is attached to the bracket assembly with mechanical fasteners or welding.

Figure 2:
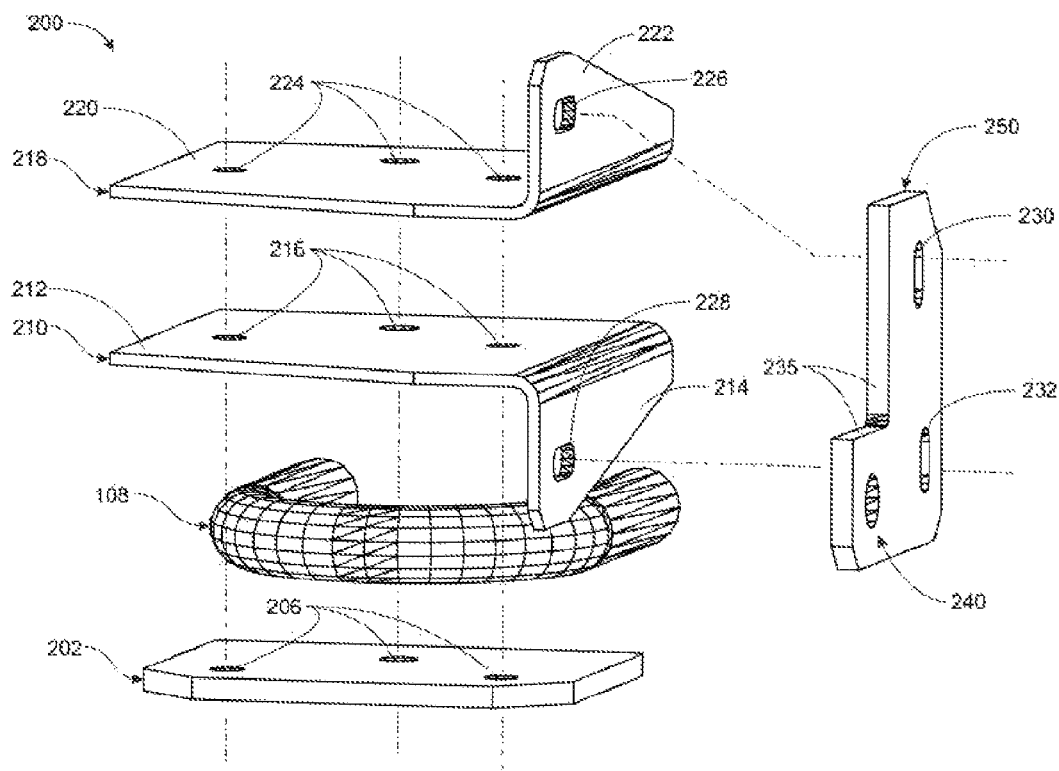
FIG. 2 shows an exploded view of one or more embodiments of the mounting system

FIG. 2 shows an exploded view of one or more embodiments of a bracket assembly 200. The clamping plate 202 is a flat plate with three or more connection points 206, such that when aligned with the tow hook 108 the connection points will surround the tow hook. The view shows, the forward portion of the tow hook 108 that extends out from the front of the vehicle. Each bracket assembly includes a lower angle bracket 210, an upper angle bracket 218, a mounting flange 250, and a clamping plate 202. The lower angle bracket 210 consists of a parallel plate 212 and a perpendicular plate 214 joined at a right angle, such that the parallel plate 212 has three or more connection points 216 that align with the connection points 206 on the clamping plate 202. The upper angle bracket 218 consists of a parallel plate 220 and a perpendicular plate 222 joined at a right angle, such that the parallel plate 220 has three or more connection points 224 that align with the connection points 216 on the parallel plate of the lower angle bracket and connection points 206 on the clamping plate, and the perpendicular plate of the upper angle bracket 222 is planar with the perpendicular plate of the lower angle bracket 214. The mounting flange 250 has connection points 232 and 230 that align with connection points on the perpendicular plate of the lower angle bracket 210 and upper angle bracket 218, respectively. The aligned connection points 228 and 232 are slotted holes with the long axis of one slotted hole arranged perpendicularly to the long axis of the other slotted hole. Aligned connection points 226 and 230 are also perpendicularly arranged slotted holes. The slotted holes in the perpendicular plates of the upper and lower angle brackets have a similar alignment with respect to their long axis. The slotted holes in the mounting flange have a similar alignment with respect to their long axis.

In one or more embodiments, the configuration of the bracket assembly and the placement and fastener patterns will differ depending on the size and shape of tow hooks for each vehicle.

In one or more embodiments the angle brackets are positioned above or below the tow hook, such that the tow hook is between the clamping plate 250 and angle brackets.

As shown in FIG. 2, each bracket assembly is assembled by connecting the mounting flanges 250 to the perpendicular plates of the upper angle bracket 222 and lower angle bracket 214 at connection points 226 and 228. The clamping plate 202 is a flat plate with three or more connection points arranged in a hole pattern. The clamping plate is attached to the parallel plates of the upper 220 and lower 212 angle brackets such that the hole patterns in the clamping plate 202 align with the hole patterns in the parallel plates, and while the assembly is held in place over the tow hooks, the hole patterns surround the tow hook from both inside and outside the tow hook's radius of curvature. In one or more embodiments, the clamping plate 202, lower angle bracket 210 and upper angle bracket 218 are attached using a combination of bolts or other such fasteners.

In one or more embodiments, three or more connection points 206 on the clamping plate 202 align with the connection points of the upper angle bracket 224 and lower angle bracket 216 such that the connection points surround the curvature of the tow hook with sufficient clearance from the inside radius and the outside radius of the tow hook to allow lateral adjustment, forward or backward and side to side movement with respect to the vehicle and tow hook, of the bracket assembly on the tow hook.

In one or more embodiments, the mounting flange 250 has slotted holes which align with perpendicularly slotted holes on the angle brackets and attaches to the angle brackets at connection points on the perpendicular plate of the lower angle bracket 228 and upper angle bracket 226. The slotted holes allow angular adjustment of the accessory equipment in the plane of connection between the mounting flange and the perpendicular plates.

Figure 5:
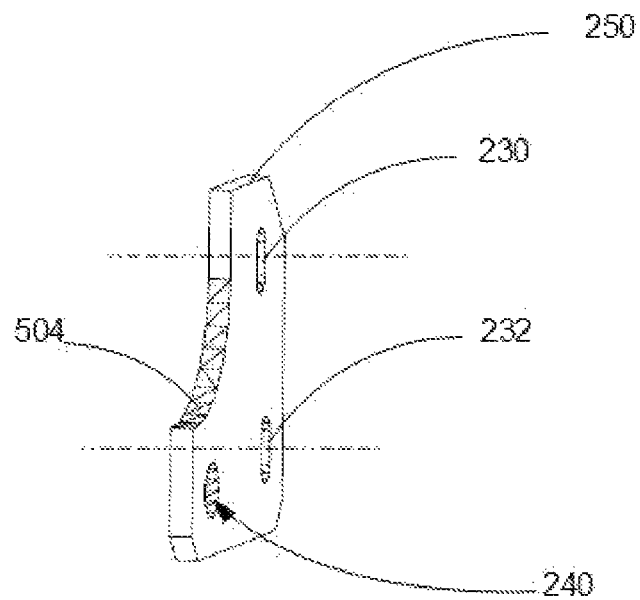
FIG. 5 shows a view of one or more embodiments of the mounting flange with a circular cutout to enable the bracket assembly to couple with a tube-shaped crossbeams.
Figure 6:
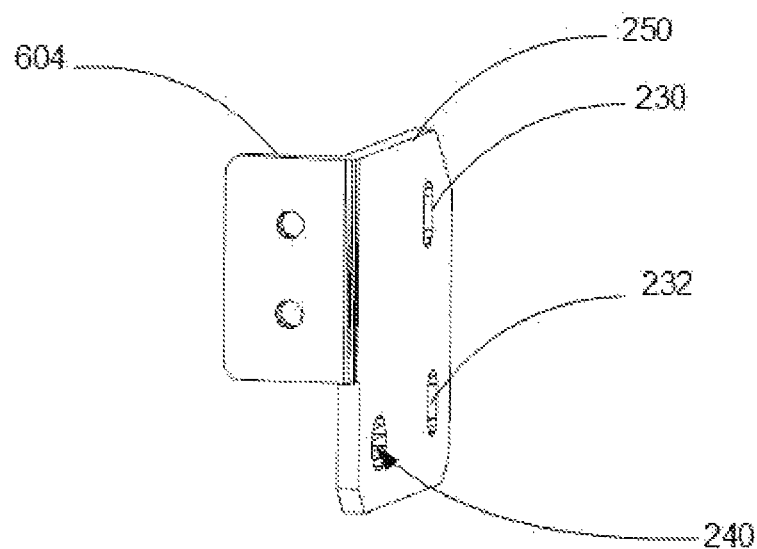
FIG. 6 shows a view of one or more embodiments of the mounting flange with a tab to enable the bracket assembly to enable a crossbeam to fit against and attach to the mounting flange.

In one or more embodiments, the mounting flange 250 has one or more features that enable it to couple with one or more cross beams. In some embodiments those features are one or more notches 235 in it to allow it to accept one or more crossbeams. In one or more embodiments, as shown in FIG. 6, these features are tabs 604 that would enable a crossbeam to fit against and attach to the mounting flange using mechanical fasteners or welding. In other embodiments, as shown in FIG. 5, the features are one or more circular cutouts 504 to allow the mounting flange 250 to couple with a tube-shaped crossbeam.

In one or more embodiments, the mounting flange 250 is attached to the crossbeam with mechanical fasteners. In other embodiments the connection is welded.

In one or more embodiments, the upper angle bracket and lower angle bracket are attached to the mounting flange 250 by loosely inserting the fasteners between the perpendicular plates of the angle brackets and mounting flange such that they are connected but not tightly so. The parallel plates of the angle brackets are connected in the same manner to the clamping plate except for the fastener that connects through the inside of the tow hook. The loosely connected assembly is placed over the tow hooks. The fastener is inserted through the inside of the tow hook. Finally, tighten all the connections.

In other embodiments, the bracket assembly is assembled, then while positioning the assembled bracket assembly in place, such that the connections are surrounding the tow hooks, attach and align the crossbeam to the assembled bracket assembly, then tighten the connections on the assembled bracket assembly to hold it in place.

In one or more embodiments, the upper angle bracket and lower angle bracket can be replaced by a single angle bracket, where the perpendicular plate runs above and below the parallel plate, such that it can be connected to both fastening locations on the mounting flange.

In one or more embodiments, the aligned connection points for the perpendicular plates of the upper angle bracket, lower angle bracket, and the mounting flange are perpendicularly slotted holes to allow angular adjustments of the accessory equipment in the plane of connection between the mounting flange and the perpendicular plates. In one or more embodiments, the slotted holes in the perpendicular plates are similarly oriented and aligned perpendicular to the slotted holes in the mounting flange.

In one or more embodiments the upper angle bracket and lower angle brackets are positioned on one side of the tow hook, parallel to the plane of curvature of the tow hook, such that the tow hook is between the clamping plate and angle brackets.

In one or more embodiments, the mounting flange 250 can have an accessory hole 240 below the crossbeam, to allow the attachment of other equipment or devices.

In one or more embodiments, each mounting flange is attached to a crossbeam such that the mounting flanges are aligned with the sides of the tow hooks.

Figure 3:
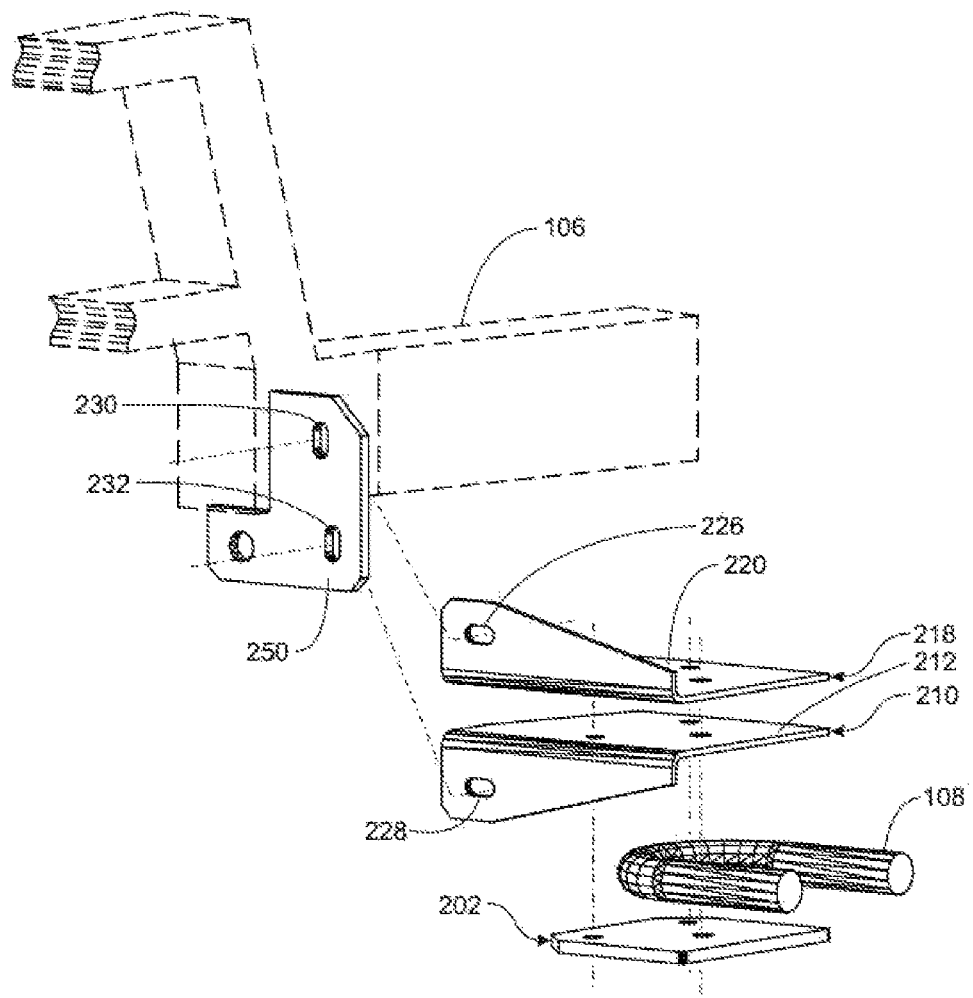
FIG. 3 shows an exploded diagram of or more embodiments of the mounting system as viewed from behind the accessory equipment.

FIG. 3 shows an exploded view of one or more embodiments of the bracket assembly 200 just prior to assembly, and its attachment to the crossbeam 106. The mounting flange 250 is connected to the crossbeam 106. FIG. 3 shows how the holes 230, 232 on the mounting flange 250 aligns with the holes on the upper perpendicular plate 226 and the lower perpendicular plate 228 while FIG. 2 shows the details of how the holes of the parallel plates 224 and 216 of the upper angle bracket 218 and the lower angle bracket 210 align with each other and the holes 206 on the clamping plate 202, and how these holes form a pattern that surround each tow hook 108.

Figure 4:
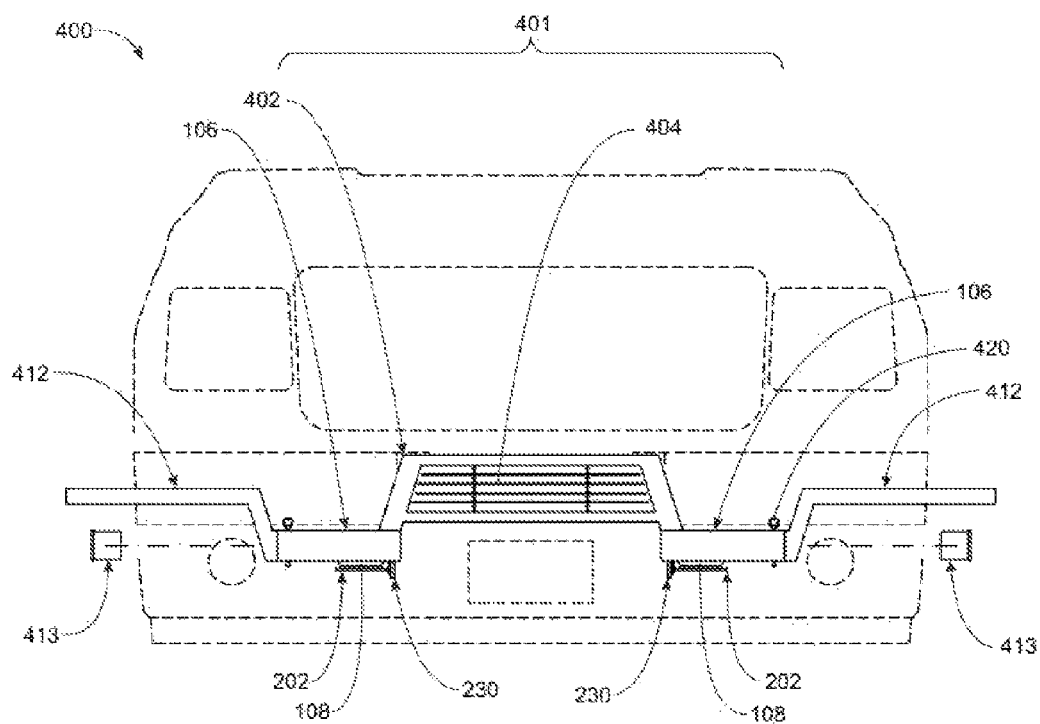
FIG. 4 shows a view of one or more embodiments of the bumper guard assembly in place, including brush bars and mounting system.

FIG. 4 shows a view of one or more embodiments of the bumper guard assembly and brush bars in place 400. In one or more embodiments, the bumper guard assembly 401 comprises a grille frame 402, a grille 404 mounted in front of the transmission oil cooler air intake opening on the vehicle, and one or more crossbeams 106 connecting to the grille frame 402. In one or more embodiments, the bumper guard assembly 401 is constructed to protect the air intake opening while allowing an unobstructed view of the front license plate of the vehicle. In other embodiments, the bumper guard assembly 401 is constructed to allow the crossbeam to pass continuously across the front of the vehicle, with optional coverage of the air intake opening, and between the tow hooks without regard to the license plate.

In one or more embodiments, each brush bar 412 is slidably attached to a crossbeam 106 on the bumper guard assembly. When installed, the brush bars extend slightly beyond the bumper of the vehicle such that they act to push debris away from the sides of the vehicle while not being so wide as to become a hazard to other vehicles. In one or more embodiments, each brush bar is 412 held in place by ball lock pins 420 or other removable fastener in the ends of the crossbeams 106. In one or more embodiments, each brush bars 412 angle up or down outside of the crossbeam 106 such that they do not block the vehicle fog lights. In other embodiments, the brush bars 412 can be replaced with end caps 413 each of which are slidably attached to a crossbeam in a similar manner as the brush bar.

In other embodiments the brush bars are pivotably attached to the ends of the crossbeam in such a manner that the pivot or hinge action allows rotating the brush bar to a retracted position against the crossbeam. In other embodiments, the brush bars are rigidly but removably attached to the ends of the crossbeam.

A bumper guard, with detachable brush bars, provides protection from debris damaging the vehicle oil cooler and is easily mounted to the vehicle tow hooks with the mounting bracket assembly.

What is claimed is:

1. A mounting system for detachably and adjustably mounting accessory equipment to tow hooks without modifying the tow hooks, bumpers or surrounding fascia components on a vehicle, the vehicle having two or more tow hooks, the accessory equipment having one or more crossbeams, the mounting system comprising:
   a bracket assembly, the bracket assembly configured with connection points that surround the tow hook from both its inside and outside radius of curvature, such that the mounting system is not restricted in angular adjustment, the bracket assembly comprising:
   a. a mounting flange, capable of being attached to the crossbeam of the accessory equipment, the mounting flange having one or more connection points,
   b. an upper angle bracket, comprising a parallel plate and a perpendicular plate, the perpendicular plate having connection points such that the perpendicular plate can be detachably connected to the mounting flange,
   c. a lower angle bracket, comprising a parallel plate and a perpendicular plate, the perpendicular plate having connection points such that the perpendicular plate can be detachably connected to the mounting flange,
   d. a clamping plate able to accept connections from said parallel plate of said lower angle bracket and said parallel plate of said upper angle bracket, so that the clamping plate and angle brackets can be placed around the vehicle tow hooks, where the mounting system can be assembled by:
   a. detachably connecting said upper angle bracket and said lower angle bracket to the mounting flange,
   b. positioning the connected assembly in place over the tow hooks, such that the connections will be made surrounding each tow hook,
   c. place the clamping plate on the tow hooks such that the fastener patterns on the parallel plates of the angle brackets and the clamping plate are aligned and with the tow hook between the parallel plates and clamping plate, the fastener pattern surrounding each tow hook,
   d. fasten the clamping plate to the parallel plate of the angle bracket,
   e. attaching the crossbeam to the assembled bracket assembly,
   f. aligning the crossbeam, and
   g. tightening the connections on the assembled bracket assembly to hold it in place.

2. The mounting system in claim 1, where the mounting flange is configured using one or more notches to accept a crossbeam.

3. The mounting system in claim 1, where the mounting flange is configured using circular cutouts to accept a crossbeam.

4. The mounting system in claim 1, where the mounting flange is configured to weld to the crossbeam.

5. The mounting system in claim 1, where the mounting flange is configured using tabs to fit against the crossbeam.

6. The mounting system in claim 1, where the mounting system is configured to attach to the crossbeam with mechanical fasteners.

7. The mounting system in claim 1, where said connection points between the mounting flange and upper and lower angle brackets are slotted perpendicular to each other, such that the accessory equipment and the mounting flange will have angular adjustment, or rotation with respect to the upper and lower angle brackets mounted on the tow hook.

8. The device in claim 1, where said connection points between the clamping plate and parallel plates of the upper and lower angle brackets are configured to provide sufficient clearance from the inside radius and the outside radius of the tow hook to allow lateral adjustment of the position of the accessory equipment, or forward or backward or side to side movement with respect to the tow hook.

9. A mounting system for detachably and adjustably mounting accessory equipment to tow hooks without modifying the tow hooks, bumpers or surrounding fascia components on a vehicle, the vehicle having two or more tow hooks, the accessory equipment having one or more crossbeams, the mounting system comprising:
   a bracket assembly, the bracket assembly configured with connection points that surround the tow hook from both its inside and outside radius of curvature, such that the mounting system allows for lateral or angular adjustment the bracket assembly comprising:
   a. a mounting flange, configured to accept to the crossbeam of the accessory equipment, the mounting flange having one or more connection points,
   b. an angle bracket, comprising a parallel plate and a perpendicular plate, the perpendicular plate having connection points such that the perpendicular plate can be detachably connected to the mounting flange,
   c. a clamping plate able to accept connections from said parallel plate of said angle bracket, so that the clamping plate and angle brackets can be placed around the vehicle tow hooks,
where the mounting system can be assembled by:
   a. detachably connecting the angle bracket to the mounting flange,
   b. hold the connected assembly in place over the tow hooks, such that the connections will be made surrounding the tow hook, c. place the clamping plate on the tow hooks such that the fastener patterns on the parallel plate of the angle bracket and the clamping plate are aligned and with the tow hook between the parallel plates and clamping plate, the fastener pattern surrounding each tow hook,
d. fasten the clamping plate to the parallel plate of the angle bracket,
e. attaching the crossbeam to the assembled bracket assembly,
f. aligning the crossbeam, and
g. tightening the connections on the assembled bracket assembly to hold it in place.

10. The mounting system in claim 9, where said connection points between the mounting flange and angle bracket are slotted perpendicular to each other, such that the accessory equipment and the mounting flange will have angular adjustment, or rotation with respect to the angle bracket mounted on the tow hook.

11. The mounting system in claim 9, where said connection points between the clamping plate and parallel plate of the angle bracket are configured to provide sufficient clearance from the inside radius and the outside radius of the tow hook to allow lateral adjustment of the position of the accessory equipment, or forward or backward or side to side movement with respect to the tow hook.

* * * * *